United States Patent [19]
Henning et al.

[11] Patent Number: 5,832,167
[45] Date of Patent: Nov. 3, 1998

[54] LIGHT DISPLAY SYSTEM WITH FIBER-OPTIC LIGHT FEEDING

[75] Inventors: Wolfram Henning; Sven Henning, both of Allersberg, Germany

[73] Assignee: Faseroptik Henning GmbH, Germany

[21] Appl. No.: 865,714

[22] Filed: May 30, 1997

[51] Int. Cl.[6] ....................................................... G02B 6/00
[52] U.S. Cl. .......................... 385/147; 385/115; 385/120; 385/901; 362/32
[58] Field of Search ..................................... 385/147, 901, 385/115, 116, 120, 121, 16, 17; 362/32

*Primary Examiner*—Phan T. H. Palmer
*Attorney, Agent, or Firm*—Evenson, McKeown, Edwards & Lenahan, P.L.L.C.

[57] ABSTRACT

A light display system using fiber-optic light feeds has a matrix plate in which information signs to be displayed (and optionally composed of several display symbols) are formed by grids of light guide exits, according to their display. The light guides are combined to form several light guide cable trees to each of which at least one main light source and one auxiliary light source are assigned on the feeding side. The feeding ends of the light guides of the respective mutually exchangeable display symbols are arranged on a plane or curved surface or line in such a manner that each one of a plurality of light sources arranged on a common carrier, as the result of the relative displacement of the light sources with respect to the feeding ends, can be positioned in front of each feeding end, with a preferably flush alignment of the optical axes of the respective lamp and of the respective light guide cable tree.

12 Claims, 8 Drawing Sheets

LIGHT DISPLAY SYSTEM WITH FIBER-OPTIC LIGHT FEEDING

BACKGROUND AND SUMMARY OF THE INVENTION

The invention relates to a variable message sign with fiber-optic light feeds which has a matrix plate in which the information signs to be displayed (which may be composed of several display symbols) are formed by grids of light guide exits, according to their display, the light guides being combined to form several light guide cable trees, each of which has assigned at its feed side at least one main light source and one auxiliary light source.

Such variable message signs are frequently mounted at highways and turnpikes, particularly on bridges over the highways. Because of their instructive function, a 100% reliability of the display must be ensured. This 100% reliability of fiber-optic variable message signs is achieved by the use of two light sources per display symbol: one light source serves as the main lamp and the second light source serves as a reserve or auxiliary lamp. When the main lamp fails, the auxiliary lamp is automatically switched on by an electronic switching and monitoring system. The main lamp and the auxiliary lamp are each assigned to the light guide cable tree required for the display of a symbol. However, 100% reliability of the display is ensured only during the operability of the main lamp.

When light is fed into the cable trees of a symbol (for example, of an existing speed indication or of a framing sign, such as a triangle or a circle of a different color, usually red), a differentiation is made between three methods.

The fiber-optic cable tree assigned to a display signal can be acted upon by the light of two light sources formed by way of an optical splitter and deflecting system. (See in this respect, for example, German Patent Document 35 00 123.) Because the light of the lamps is divided into two paths by means of transmission and reflection, each path has less than half the original light quantity due to loss of a portion of the light quantity in reflections and absorptions. The two lamps operate congruently within the system.

In another embodiment of the invention, the input side of the fiber-optic cable tree assigned to a symbol receives the light of two light sources which, at an angle next to one another, are each arranged outside the optical axis of the light guide cable tree. The remoteness of the light sources from the optimal axis of the light guide cable tree in this case results in increased losses of coupled-in light in the cable tree.

Finally, in a third embodiment of the electro-optical light feed according to the invention, the optical fibers of two light guide cable trees are alternately assigned to a display symbol to be shown on the matrix plate. The switch-over from the main light source to the auxiliary light source causes a symbol offset about the different arrangement of the light guide ends.

For every different display within a fiber-optic variable message sign, the above-described three known systems require at least one main and one reserve lamp respectively. This has the result that, even in the case of a very simple variable message sign, which can alternately display only four different speeds within a framing circle, ten (five times two) lamps are available. Moreover, the 100% reliability of the display, is limited to the operating time of the main lamp, and is terminated when one of the main lamps fails. The fiber-optic variable message signs used today, in which many additional display possibilities are provided, require a multiplicity of main and auxiliary light sources, with the immense requirement for circuits, installations and material. The larger the number of lamps, the larger the risk that one of the lamps may fail, whereupon 100% display reliability is no longer ensured. Then, in response to a corresponding signal from the variable message sign at the maintenance station a maintenance technician must immediately be sent to exchange the lamps. Since, for safety reasons, all main lamps are usually exchanged simultaneously even if only one has failed, such an exchange is disturbing not only with respect to the expenditure of material but also because of the high personnel costs.

It is therefore an object of the invention to provide a message sign of the initially mentioned type in which, on the one hand, light can be fed into the corresponding light guide cable trees with as little loss as possible and, in addition, the service intervals required for the 100% reliability of the display can be extended without increasing the expenditure of existing light sources.

This and other objects and advantages are achieved by the fiber optic light display system according to the invention, in which the feeding ends of the light guides of the display symbols which can each be mutually exchanged are arranged on a flat or curved surface or line in such a manner that any of a plurality of light sources arranged on a common carrier, can optionally be positioned in front of each feeding end, by a relative displacement of the light sources with respect to the feeding ends, with a preferably flush alignment of the optical axes of the lamp and the light guide with respect to one another.

The invention therefore deviates from the previous principle of assigning one auxiliary lamp to each display symbol. Instead, a plurality of lamps are provided which can optionally be positioned in front of the light entry end of each cable tree. When n light sources or lamps are provided, this means that 100% display reliability will no longer exist, and servicing will be required, only after the failure of n minus one lamps. If six light sources were used in the arrangement according to the invention, this would mean that by means of these six light sources only three display symbols could have been operated, in which case three of the lamps would have been main light sources and three would have been auxiliary light sources. A servicing would have been required in the case of the failure of only one of the light sources, —thus one of the three optionally first burning main light sources. In the variable message sign according to the invention, a differentiation between main light sources and auxiliary light sources no longer exists, and the time between lamp exchanges therefore statistically increases five times, since it is only when the fifth lamp fails that the situation is reached that only one reserve light source is still available, requiring a lamp exchange.

The development of a variable message sign according to the invention also permits in a very simple manner the flush alignment of the optical axis of the respective lamp with the optical axis of the respective light guide cable tree.

In a particularly advantageous manner, at least two groups of light sources and display symbols are to be provided, in which case one display symbol can in each case light up simultaneously with a display symbol of another group. For example, in the case of typical message signs, the one group of display symbols comprises the framings in different colors and shapes of a variable message sign (circle, triangle or the like) and another group comprises the possible speed values which are to be indicated in this framing. However, other groups of display signals may also be provided. Each of these groups comprises a plurality of light sources which can optionally be positioned in front of the input end of the light guide cable trees assigned to the respective display symbols.

According to a first embodiment of the present invention, the light sources of each group are arranged on a rotary plate with a step motor, and are displaceable with respect to the stationary light entry surfaces of the light guide cable trees. The arrangement of the light sources on the rotary plate can take place in two manners. In the first implementation, the optical axes of the light sources are arranged radially in a plane parallel to the rotary plate and the light guide entry surfaces in this plane are preferably arranged perpendicularly to the respective connection line to the axis of rotation of the rotary plate. In the second variant, the light sources are arranged in parallel next to one another, on a circular arc about the axis of rotation of the rotary plate, with a light exit axis arranged perpendicularly to the rotary plate, while the light entry surfaces of the cable trees in the cylinder jacket surface formed by the light exit axes are preferably also arranged perpendicularly to the light exit axes of the light sources.

Instead of providing the above-mentioned rotary plate adjustment, in further embodiment of the invention, the light sources of each group are arranged on a carriage with a step motor, side-by-side with mutually parallel light exit axes, and the light entry surfaces of the cable trees are arranged side-by-side in the carriage displacement plane, preferably perpendicularly to the light exit axes of the light sources. In the case of a failure of the respective operative light source, the step motor is switched to the next light source automatically by the electronic switching and monitoring system; and, during a change of the display symbol, the light source which is operative in each case is displaced correspondingly by means of the step motor so that it faces the cable tree entry ends, corresponding to the displacement of the entry surfaces of the light guide cable trees.

Finally, it is also within the scope of the invention to provide a stationary arrangement of the light sources as well as the light entry surfaces of the light guide trees, and to connect them with one another optically by movable intermediate light guides which can be displaced on one or both ends. Displacement of the respective light guide ends can be effected by way of carriages or rotary plates which can be adjusted by step motors, in a manner similar to the above described arrangement in which the light sources are displaceable with respect to the light entry ends of the light guide cable trees. Furthermore, it is understood that this displacement is always only a relative displacement so that theoretically it being simpler (in most cases to displace the light sources) it would also be possible to keep the light sources stationary and to displace the air entry ends of the light guide cable trees with respect to the light sources.

Additional advantages, characteristics and details of the invention are found following description of several embodiments, as illustrated in the accompanying drawing.

DETAILED DESCRIPTION OF THE INVENTION

Figure 1A:
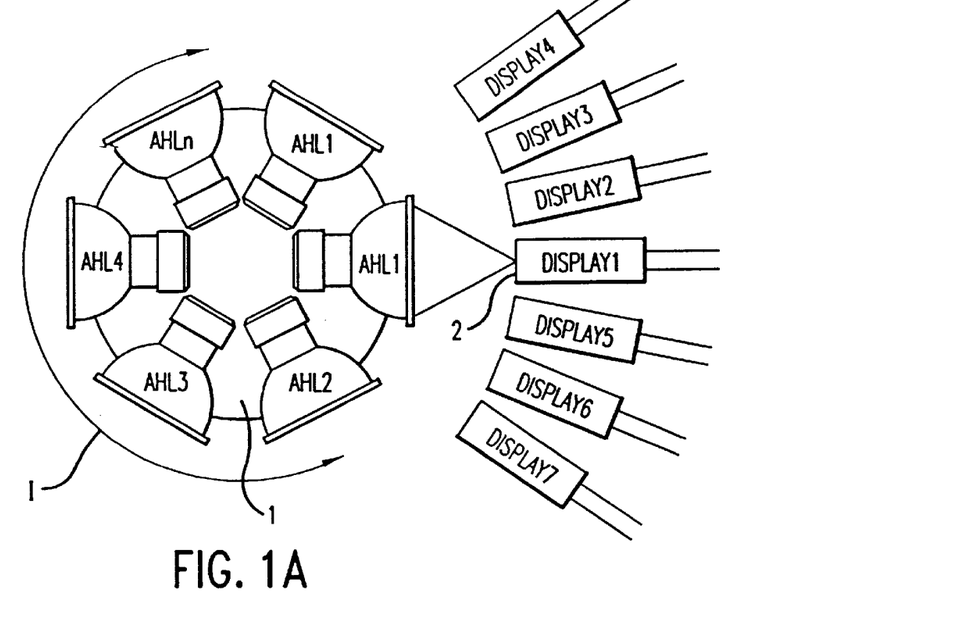
FIG. 1 is a schematic representation of a display system according to the invention, which provides the feeding of light into the cable trees by two groups of light sources arranged on rotary plates, so that optionally one display of one group and one display of the second groups may be illuminated simultaneously.
Figure 1B:
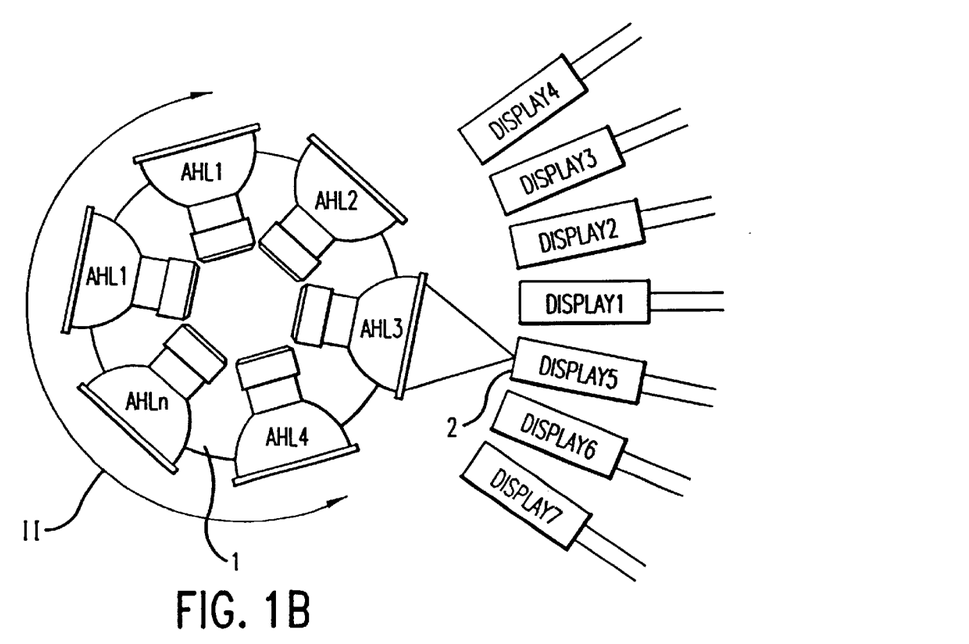

In the embodiment according to FIG. 1, two groups I and II of six light sources are mounted on rotary plates 1 which can be rotated by means of a step motor (not shown). The light sources AHL1 to AHLn are arbitrarily called main display sources 1 to n, while the absent last light source is called auxiliary display light source ANL. These illustrated six light sources, in the case of the first group I as well as of the second group II, are assigned to seven different cable trees for seven different display symbols. Only one display symbol from each of the groups I and II can be indicated (that is, not two from one group). However, it is possible for one of the display symbols of group I to be displayed in conjunction with one of the display symbols of group II, for example, in the sense that one represents the framings and the other group comprises the different inside symbols. FIG. 1, for example shows a case in which the display symbol 1 of group I (e.g., the red circular ring), is to light up together with the display symbol 5 of group II (e.g., a certain speed information). For this purpose, the light source AHL1 is aligned in registration with the light entry surface of the light guide cable tree of display symbol 1, and correspondingly a light source (in the present case, the lamp AHL3) of group II, is assigned to the light entry surface 5 of the light guide cable tree for the display symbol 5 of the second group.

Considering, for reasons of simplicity, only the top group I, in the event of a failure of light source AHL1, the electronic switching and monitoring system and the step motor for the rotary plate 1 automatically switch the rotary plate 1 by the angular offset of the light source with respect to one another so that, instead of the light source AHL1, the light source AHL2 will then be situated in front of the light entry surface 2 of the light guide cable tree for the display symbol 1. Correspondingly, in the case of the failure of this lamp (AHL2), the clocking can be continued. Only when the fifth light source has failed (which, because of the generalizing character, is called AHKn), is 100% display reliability no longer achieved (because then only the one reserve lamp will be left, specifically the ANL1), so that servicing must take place by means of a lamp exchange. The same principles naturally apply correspondingly to Group II.

Figure 2:
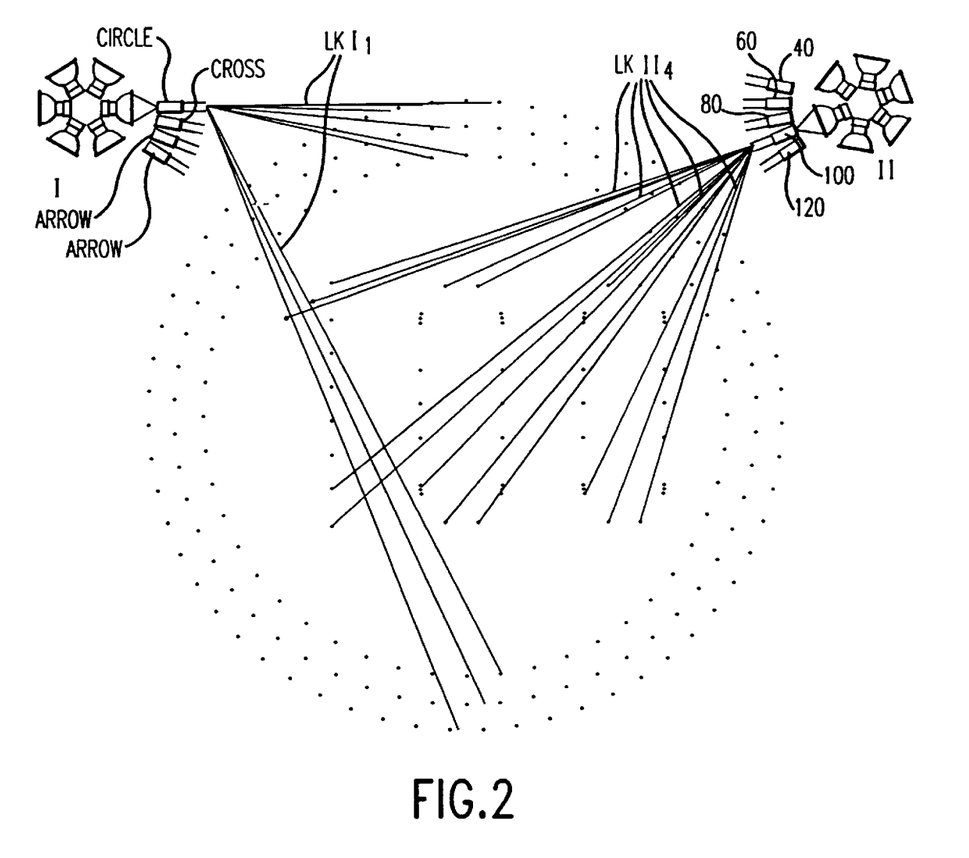
FIGS. 2 to 4 are schematic representations of information symbols on the matrix which can be generated by means of the rotary plate light feeding according to FIG. 1.
Figure 3:
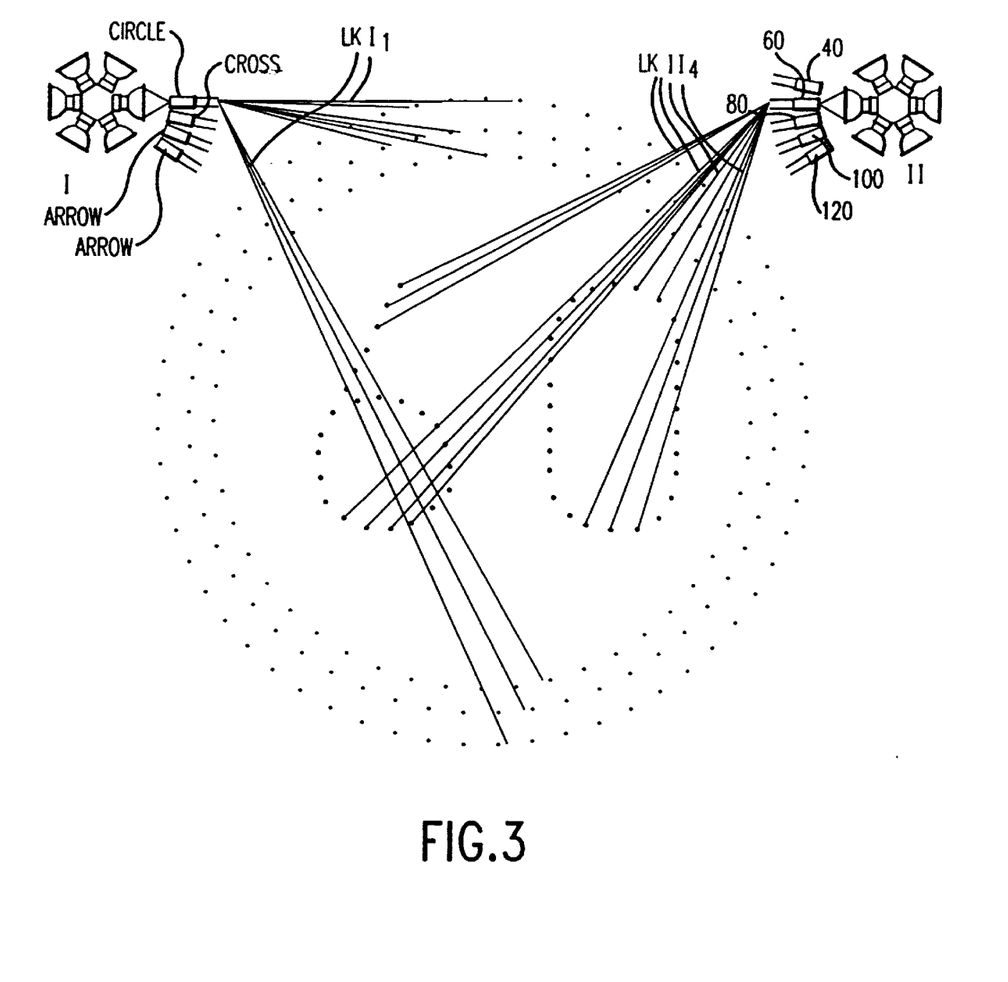
Figure 4:
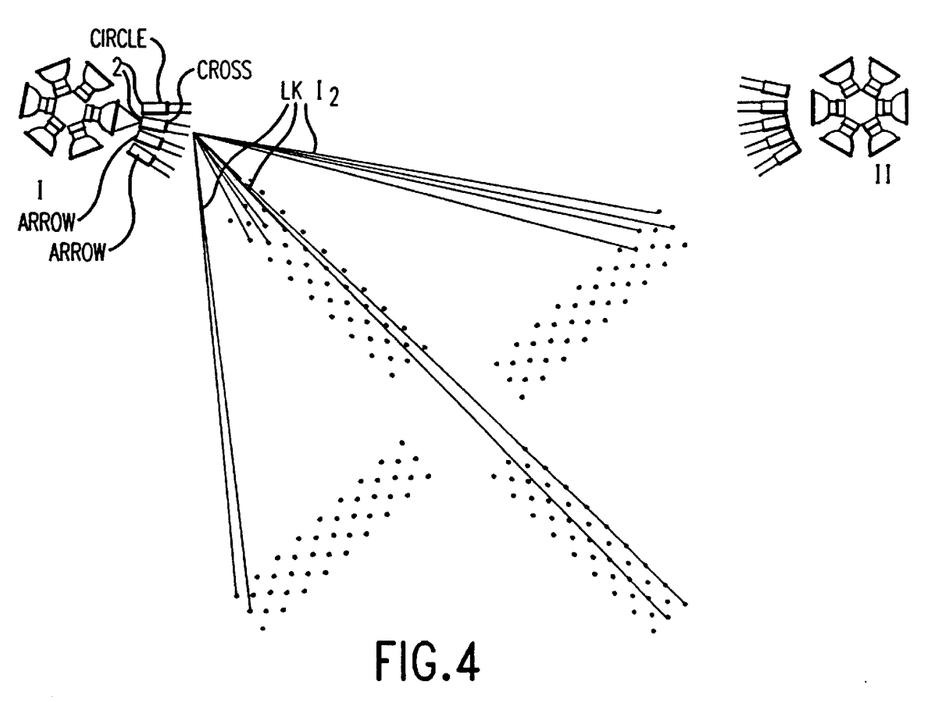

FIGS. 2 to 4 show three possible information signs which can be implemented in an expedient and failure-proof manner by means of the fiber-optical light feeding according to FIG. 1. In these FIGS. group 1 comprises four display symbols: a red framing circle, a red cross, a right arrow and a left arrow, while group II comprises five different speed indications from 40 to 120. FIG. 2 illustrates the generation of the information sign 100 km in the red round circle. FIG. 3, on the other hand, shows an information sign 60 km in the red circle; while FIG. 4 shows the red cross alone as an information sign, without any display symbol of group II. Correspondingly, many more information signs composed of two or more groups of display symbols can naturally be formed. In all cases, because of the elimination according to the invention of a fixed assignment of a main and an auxiliary lamp to each display symbol, a significant increase of the servicing interval can be achieved. At the same time, it can be ensured in a simple manner that all light of a light source arrives without losses in the light entry surface of the respective light guide trees. However, these light guide cable trees $LKI_1$, $LKI_2$ and $LKII_4$ are shown only schematically in their end branching onto the matrix. Only the feeding-side light entry surface 2 of the light guide cable trees is schematically illustrated in FIGS. 2 to 4.

Figure 5A:
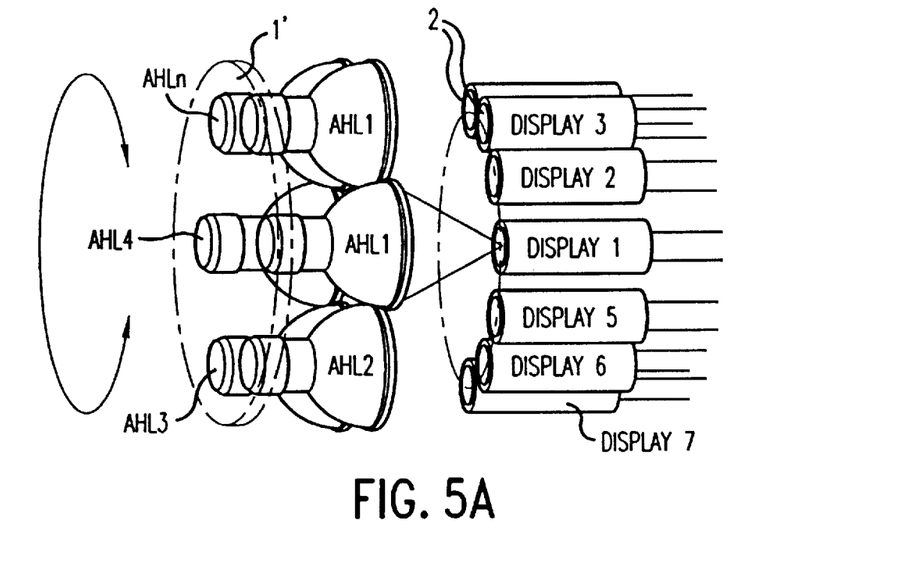
FIG. 5 is a schematic representation of the fiber-optic light feeding by means of rotary plates with a different distribution of the light sources and the light guide cable tree light entry surfaces with respect to one another.
Figure 5B:
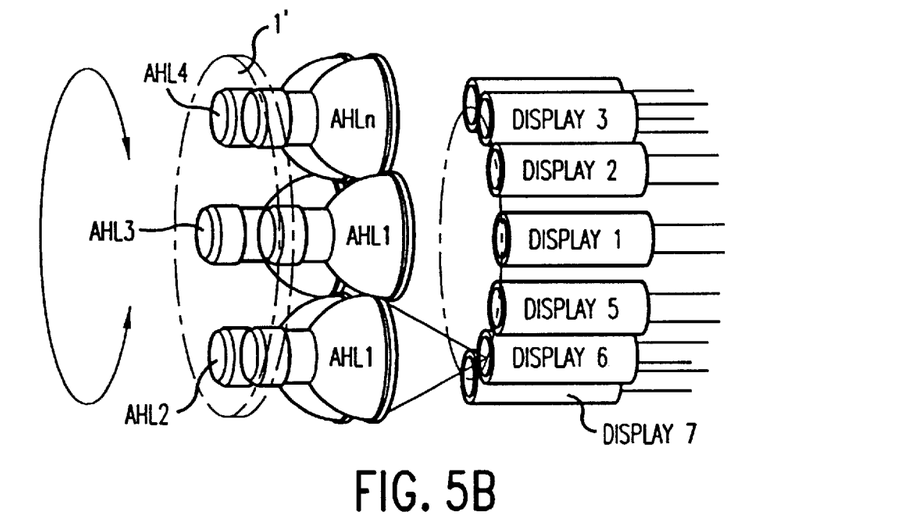

FIG. 5 shows a modified embodiment of a fiber-optic light feed using a rotary plate 1'. In this embodiment, the light sources do not radiate in the plane of the rotary plate radially offset to radius rays, but are directed with their optical axes perpendicular to the plane of the rotary plate 1'. The light sources, which have the same designations as in FIG. 1 are in this case arranged in a circle, as are the feeding ends of the light guide cable trees for the different display symbols 1–7, with their respective light entry surfaces 2.

Figure 6A:
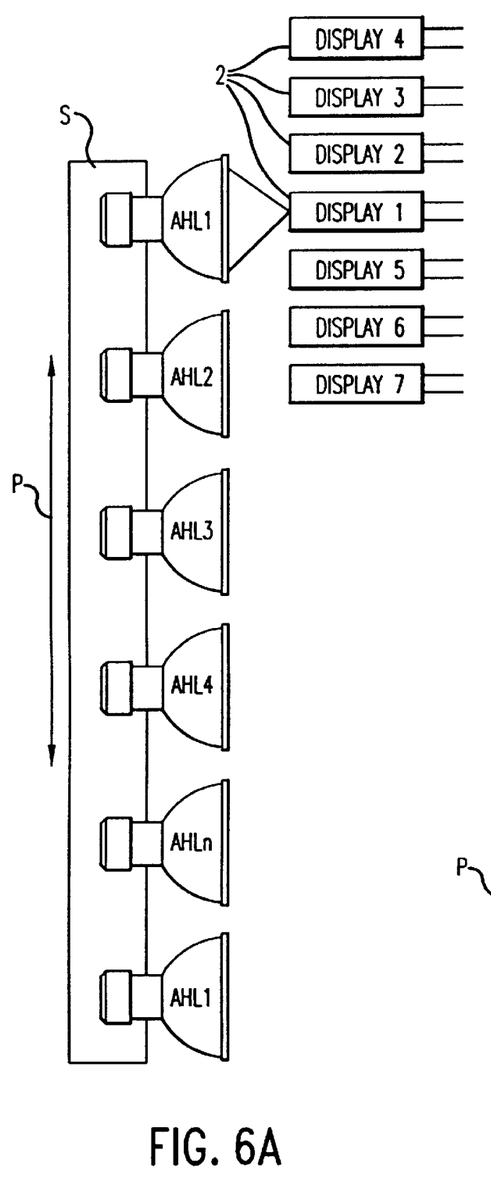
FIG. 6 is a schematic representation, corresponding to FIGS. 1 and 5, of light feeding by means of light sources linearly displaceable on a carriage.
Figure 6B:
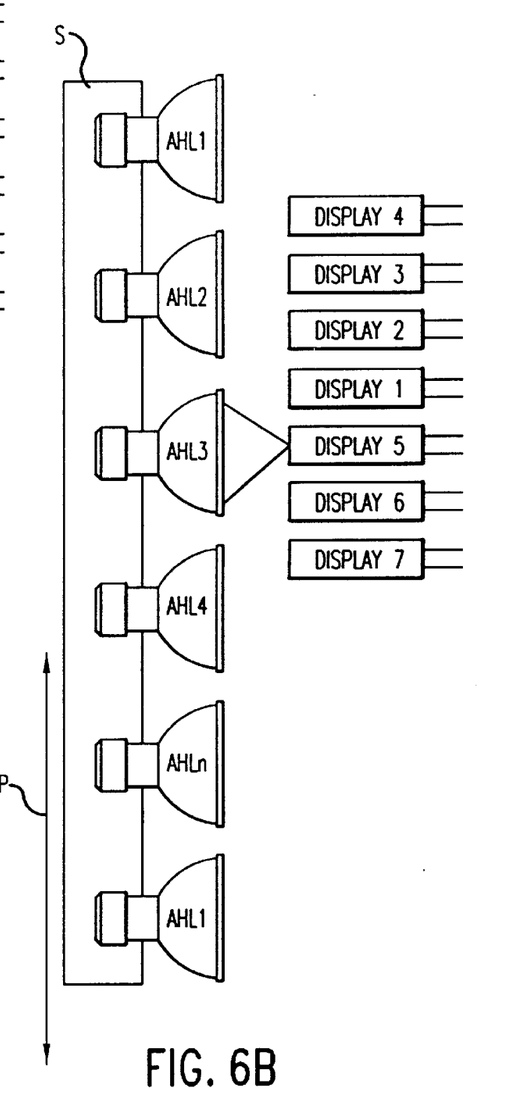

FIG. 6 shows an arrangement in which the light guide cable trees for the different display symbols are arranged side-by-side in a row, while the light sources are fastened on a carriage S which can be displaced in the direction of the double arrow P, so that, by linear movement along the double arrow P, they can again be positioned by means of a step motor in the addressed manner optionally in front of the light entry surface 2 of one of the cable trees for a display symbol.

Figure 7:
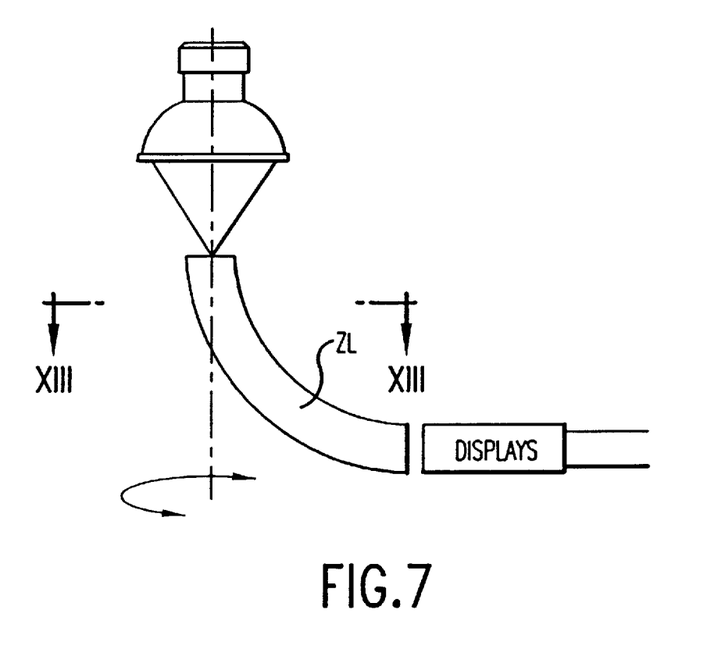
FIG. 7 is a schematic lateral view of an arrangement having an intermediate light guide for distributing light between the light sources and the cable trees.
Figure 8:
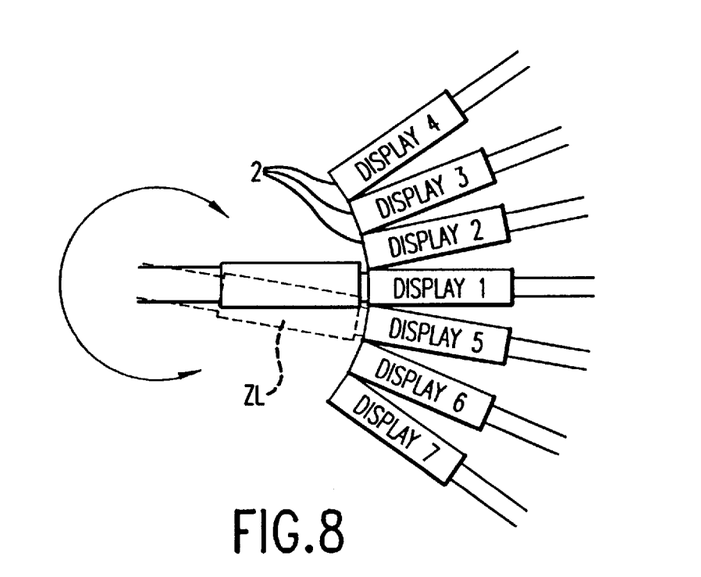
FIG. 8 is a sectional view along Line VIII-VIII in FIG. 7, the flexible intermediate light guide being adjustable by means of a rotary plate.

FIGS. 7 and 8, illustrate how light can be distributed from one or several light sources arranged on a circular arc to the different light guide cable trees for the display symbols of a group, without the displacement of the actual lamp. For this purpose, a flexible intermediate light guide ZL is provided which, as illustrated in FIG. 8, by rotating its end facing away from the lamp (by means of a rotary plate or the like), can be positioned in front of the light entry surface 7 of a desired light guide cable tree, while the other end remains either in front of a fixed light source or, in a similar manner, is moved to another light source by means of a rotary plate. It is understood that, in this case, the intermediate light guide ZL is not simply a quadrant circle, because a reverse loop must be available in this case so that it can compensate the different distances during the switch-over to additional light sources.

Figure 9:
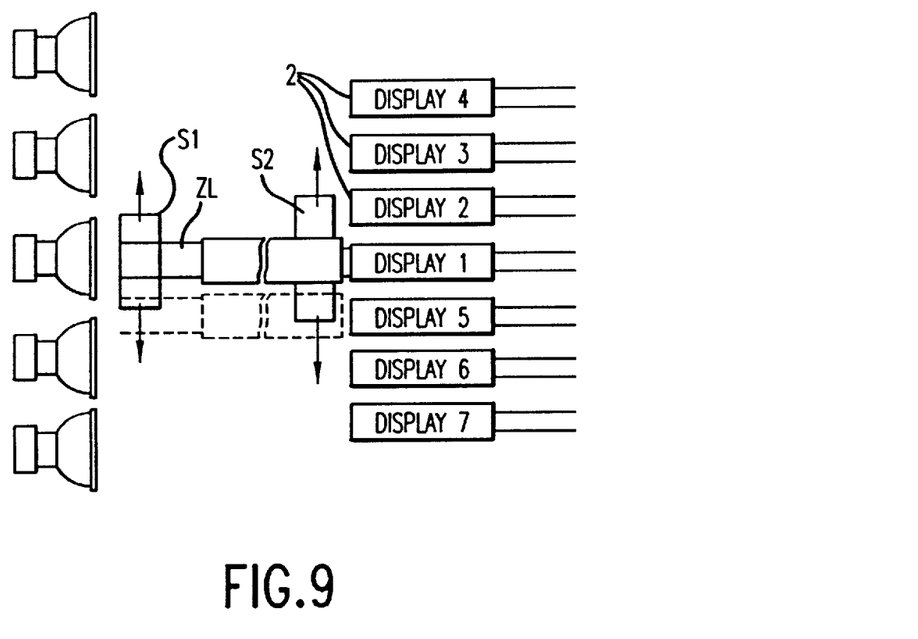
FIG. 9 is a schematic representation of the fiber-optic light feeding according to the invention by means of a flexible light guide whose one end can be positioned by way of a carriage in front of the cable trees and whose other end can be positioned in front of the light sources by way of a second carriage.

Finally, FIG. 9 is a schematic view of an arrangement of which a flexible light guide, again having a compensation loop (not shown for reasons of simplicity), can be displaced by means of two schematically indicated carriages S1 and S2. One end of the flexible light guide is positioned in front of different light sources and, on the other end, in front of the light entry surfaces 2 of the different cable trees. In this manner, a selected one of the light sources can be optically coupled to desired one of the light guide cable trees.

It is, of course, apparent that in the arrangement according to the invention, in addition to the above-mentioned intermediate light guides, other optical deflection systems with prisms, mirrors or the like, can be used for the optical coupling of the rigidly arranged lamps with rigidly arranged light guide cable trees. This arrangement has the following advantages:

1. No splitting mirror, double light intensity, no losses on the splitter; use of lamps with less lighting current and therefore a longer operating time.
2. A light source for several displays; reduction of the number of lamps; double displays impossible.
3. Use of a plurality of standby lamps; prolonging of the servicing intervals; using up the lighting devices to the last spare lamp.
4. Favorable laying of fibers because the end sleeve can be arranged in parallel to the front; reduction of the number of cable trees.
5. Low electric cabling expenditures on the variable message sign since the lamp module can be prefabricated externally; during servicing, the lamp module can be is exchanged as a whole;
6. Flat lamp module reduces housing depth. Fewer mounted components reduce the weight of the variable message sign. The weight of the variable message sign influences the suspension and the bridge construction.
7. Light feeding along long light guides renders variable message signs suitable for a continuous operation without any servicing over the road for the duration of the planned usage time of approximately 15 years. Reduction of the feeding light guides.
8. Less consumption of material; lower manufacturing costs easily reusable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fiber-optic light display system, having a matrix plate in which a plurality of symbols to be displayed are formed by grids of light guide exits, the light guides being combined to form several light guide cable trees to each of which, on the feeding side of the light guide at least one main light source and one auxiliary light source are assigned, wherein: the feeding ends of the light guides of the respective display symbols which can be exchanged with one another are arranged such that by means of a relative displacement of the light sources with respect to the feeding ends each one of a plurality of light sources arranged on a common carrier can be aligned in registration with an optical axis of each feeding end.

2. Light display system according to claim 1, wherein the light sources of each group are arranged on a rotary plate with a step motor, and can be adjusted with respect to the stationary light entry surfaces of the light guide cable trees.

3. Light display system according to claim 2, wherein the optical axes of the light sources are arranged on radii in a plane in parallel to the rotary plate and entry surfaces of the light guides are arranged in this plane.

4. Light display system according to claim 3, wherein the light guide entry surfaces are arranged perpendicularly to a respective connection line to the axis of rotation of the rotary plate.

5. Light display system according to claim 2, wherein:
the light sources are arranged in parallel side-by-side on a circular arc around an axis of rotation of the rotary plate with a light exit axis perpendicular to the rotary plate; and entry surfaces of the cable trees of a cylinder jacket surface formed by the light exit axes are arranged perpendicularly to the light exit axes.

6. Light display system according to claim 1, wherein at least two groups of light sources and display symbols are provided, one display signal of a group respectively being able to simultaneously light up with a display symbol of another group.

7. Light display system according to claim 1, wherein the light sources of each group are arranged on a carriage with a step motor side-by-side with mutually parallel light exit axes, and the light entry surfaces of the cable trees are arranged side-by-side in a carriage displacement plane preferably perpendicularly to the light exist axes.

8. Light display system according to claim 1, comprising stationary light sources and stationary light guide cable trees; and further comprising movable light deflecting devices, which can be displaced at least one end thereof, can be optically coupled with the light entry surfaces of the light guide cable trees.

9. A fiber optic light display system according to claim 1 wherein:

said light sources are aligned in a linear configuration; and said feeding ends of said light cable guides are arranged in a linear configuration opposite said light sources, whereby different ones of said feeding ends can be illuminated by different ones of said light sources, by relative linear movement of said light sources and said feeding ends.

10. A fiber optic light display system according to claim 1 wherein:

said light sources are arranged in a common plane, with optical axes thereof aligned radially outward; and said feeding ends of said light cable guides are arranged in a configuration such that by rotation of said light sources, any one of said feeding ends may be illuminated by any one of said light sources.

11. A fiber optic light display system according to claim 1 wherein:

said light sources are arranged in a circular configuration with optical axes thereof aligned in parallel; and said feeding ends of said light cable guides are arranged in a circular configuration with optical axes of said feeding ends aligned in parallel, opposite said light sources, whereby an optical axis of different ones of said feeding ends can be illuminated by different ones of said light sources by relative rotation of said light sources and said feeding ends.

12. A fiber optic light display system comprising:

a matrix plate having a plurality of display symbols formed therein by grids of light guide exits, light guides of each display symbol being combined to form respective light guide cable trees; and a plurality of light sources arranged on a common carrier;

wherein feeding ends of the light cable guides of the respective display symbols are arranged in an array opposite said plurality of light sources so that by relative displacement of said feeding ends and said common carrier, each of said plurality of light sources can be aligned in registration with an optical axis of a feeding end of any one of said light guide cable trees, for illumination thereof.

\* \* \* \* \*